US009215656B2

(12) United States Patent
Pecen et al.

(10) Patent No.: US 9,215,656 B2
(45) Date of Patent: Dec. 15, 2015

(54) SELF-CONTAINED DATA TRANSFER CHANNEL

(71) Applicant: BlackBerry Limited, Waterloo (CA)

(72) Inventors: Mark E. Pecen, Waterloo (CA); Biswaroop Mukherjee, Stittsville (CA); Shalini Suresh Periyalwar, Waterloo (CA); Chandra Sekhar Bontu, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 258 days.

(21) Appl. No.: 13/918,332

(22) Filed: Jun. 14, 2013

(65) Prior Publication Data
US 2014/0369245 A1 Dec. 18, 2014

(51) Int. Cl.
*H04W 72/04* (2009.01)
*H04W 52/02* (2009.01)

(52) U.S. Cl.
CPC ...... *H04W 52/0216* (2013.01); *H04W 52/0212* (2013.01); *H04W 72/0406* (2013.01)

(58) Field of Classification Search
CPC .............. H04W 52/0216; H04W 72/0406; H04W 52/0212
See application file for complete search history.

(56) References Cited

U.S. PATENT DOCUMENTS

| | | | |
|---|---|---|---|
| 2006/0050664 A1* | 3/2006 | Guey | 370/329 |
| 2012/0177092 A1* | 7/2012 | Zirwas | 375/219 |
| 2012/0218953 A1* | 8/2012 | Zirwas et al. | 370/329 |
| 2013/0114522 A1* | 5/2013 | Frenne et al. | 370/329 |

OTHER PUBLICATIONS

3GPP TS 45.001; "Technical Specification; 3rd Generation Partnership Project; Technical Specification Group GSM/EDGE Radio Access Network; Physical layer on the radio path; General description", (3rd Generation Partnership Project (3GPP) Technical Specification); Sep. 2012; 44 pages.
3GPP TS 22.368 V12.0.0; Technical Specification; 3rd Generation Partnership Project; Technical Specification Group Services and System Aspects; Service requirements for Machine-Type Communications (MTC); Stage 1 (Release 12); Sep. 2012; 25 pages.
3GPP TR 37.868 V11.0.0; Technical Report; 3rd Generation Partnership Project; Technical Specification Group Radio Access Network; Study on RAN Improvements for Machine-type Communications; (Release 11); Sep. 2011; 28 pages.
3GPP TSG-RAN V\IG2 #66bis; R2-093812; Agenda Item: 7.2; Contention based uplink transmissions; Ericsson, ST-Ericsson, Jun. 29-Jul. 3, 2009; 4 pages.

(Continued)

*Primary Examiner* — Jay P Patel
(74) *Attorney, Agent, or Firm* — Conley Rose, P.C.; J. Robert Brown, Jr.

(57) ABSTRACT

A data transfer system may coordinate the transfer of user data and control data using a self-contained data channel without using a separate control channel in a time period between set-up and tear-down of the self-contained data channel. For example, a plurality of data transfer resources may be established in a self-contained data channel between user equipment and a network controller. User data is transferred between the user equipment and the network controller in at least one of the plurality of data transfer resources of the self-contained data channel. Additionally, control data is transferred between the user equipment and the network controller in at least one of the plurality of data transfer resources of the self-contained data channel.

31 Claims, 14 Drawing Sheets

(56) References Cited

OTHER PUBLICATIONS

3GPP TSG-RAN WG2 #67bis; R2-095805; Agenda Item: 7.2; Details of latency reduction alternatives, Ericsson; R2-095805 listed as "last modified" on Oct. 6, 2009 in Internet file directory; 21 pages.

3GPP TS 36.331, "Evolved Universal Terrestrial Radio Access (E-UTRA); Radio Resource Control (RRC) Protocol specification", Release 10, http://www.3gpp.org/ftp/Specs/htmlinfo/36331.htm; Jun. 2012; 302 pages.

3GPP TS 36.321, "Evolved Universal Terrestrial Radio Access (E-UTRA); Medium Access Control (MAC) protocol specification", V 11.0; Sep. 2012; 55 pages.

3GPP TS 36.213, "Evolved Universal Terrestrial Radio Access (E-UTRA); Physical layer procedures", V11.0; Sep. 2012; 143 pages.

3GPP TS 36.300 V11.3.0; Evolved Universal Terrestrial Radio Access (EUTRA) and Evolved Universal Terrestrial Radio Access Network (E-UTRAN); Overall description; Stage 2, Release 11; Sep. 2012; 205 pages.

Hybrid MTC Channel, 3GPP TSG Geran #49, 2011, NSN, GP-110230; Chengdu, P.R. China; Feb. 28-Mar. 4, 2011; 8 pages.

3GPP TS 43.064, "Technical Specification; Overall description of the GPRS radio interface; Stage 2 (Release 4)", (3rd Generation Partnership Project (3GPP) Technical Specification); Apr. 2004; 59 pages.

* cited by examiner

| Index | LCID values for DL SCH |
|---|---|
| 00000 | CCCH |
| 00001-01010 | Identity of the logical channel |
| 01011-11001 | Reserved |
| 11010 | LPCH specifc command |
| 11011 | Activation/Deactivation |
| 11100 | UE Contention Resolution Identity |
| 11101 | Timing Advance Command |
| 11110 | DRX Command |
| 11111 | Padding |

| Index | LCID values for UL SCH |
|---|---|
| 00000 | CCCH |
| 00001-01010 | Identity of the logical channel |
| 01011-10111 | Reserved |
| 11000 | LPCH specific command |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Figure 12

```
                    LPCH-Config information element
-- ASN1START

LPCH-Config ::= SEQUENCE {
   lpchC-RNTI         C-RNTI          OPTIONAL,    -- Need OR
   lpch-ConfigDL      SPS-ConfigDL    OPTIONAL,    -- Need ON
   lpch-ConfigUL      SPS-ConfigUL    OPTIONAL     -- Need ON
}

LPCH-ConfigDL ::=   CHOICE{
      release                NULL,
      setup                  SEQUENCE {
         lpchIntervalDL      ENUMERATED {
                                   sf10000, sf64000,
                                   sf128000, sf640000, spare6,
                                   spare5, spare4, spare3, spare2,
                                   spare1},
         numberOfConflpch-Processes    INTEGER (1..8),
         lpchDlFreqLocation   SEQUENCE {
            rb-Start          INTEGER (0 .. 99),
            rb-Len            INTEGER (0 .. 100)
         }
      }
}

LPCH-ConfigUL ::=   CHOICE {
      release                NULL,
      setup                  SEQUENCE {
         lpchIntervalUL      ENUMERATED {
                                   sf10000, sf64000,
                                   sf128000, sf640000, spare6,
                                   spare5, spare4, spare3, spare2,
                                   spare1},
         implicitUnusedActionAfter    ENUMERATED {e2, e3, e4, e8},
         implicitUnusedAction         ENUMERATED {a1, a2, a3, a4, a5}, p0-Persistent            SEQUENCE {
            p0-NominalPUSCH-Persistent    INTEGER (-126..24),
            p0-UE-PUSCH-Persistent        INTEGER (-8..7)
         }   OPTIONAL,                                          -- Need OP ...
lpchUlFreqLocation        SEQUENCE {
      rb-Start            INTEGER (0 .. 99),
      rb-Len              INTEGER (0 .. 100)
}
lpchUlModulationAndCodingScheme    ENUMERATED {c1, c2, c3, ... c10},

}
}
-- ASN1STOP
```

Figure 16

| LPCH-Config field descriptions |
|---|
| *implicitUnusedActionsAfter* |
| Number of empty transmissions before implicit action is taken, where the value of action is specified in the next field. Value e2 corresponds to 20 transmissions, e3 corresponds to 30 transmissions and so on. |
| *implicitUnusedActions* |
| The implicit action undertaken after unused allocations. Value a1 corresponds to release, a2 corresponds to double grant periodicity, a3 corresponds to halving the RBs (first RB remains the same), a4 corresponds to halving the last used MCS. |
| *numberOfConfLPCHHARQ-Processes* |
| The number of configured HARQ processes for LPCH, see TS 36.321 [6]. |
| *p0-NominalPUSCH-Persistent* |
| Parameter: $P_{O\_NOMINAL\_PUSCH}(0)$. See TS 36.213 [23, 5.1.1.1], unit dBm step 1. This field is applicable for persistent scheduling, only. If choice setup is used and *p0-Persistent* is absent, apply the value of *p0-NominalPUSCH* for *p0-NominalPUSCH-Persistent*. |
| *p0-UE-PUSCH-Persistent* |
| Parameter: $P_{O\_UE\_PUSCH}(0)$. See TS 36.213 [23, 5.1.1.1], unit dB. This field is applicable for persistent scheduling, only. If choice setup is used and *p0-Persistent* is absent, apply the value of p0-UE-PUSCH for *p0-UE-PUSCH-Persistent*. |
| *lpchC-RNTI* |
| Low Priority Channel C-RNTI, see TS 36.321 [6]. |
| *lpchIntervalDL* |
| Low Priority Channel grant interval in downlink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames. |
| *lpchSchedIntervalUL* |
| Low Priority Channel grant interval in uplink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames. |
| *lpchDlFreqLocation* |
| Shows the assigned time frequency resources of the LPCH channel in downlink |
| *lpchUlFreqLocation* |
| Shows the assigned time frequency resources of the LPCH channel in the uplink |
| *lpchUlModulationAndCodingScheme* |
| The modulation and coding scheme to be used for the LPCH channel in uplink |

| Conditional presence | Explanation |
|---|---|
| TDD | This field is optional present for TDD, need OR; it is not present for FDD and the UE shall delete any existing value for this field. |

Figure 17

SELF-CONTAINED DATA TRANSFER CHANNEL

BACKGROUND

1. Technical Field

This application relates to communication systems and, more particularly, to a self-contained data transfer channel.

2. Related Art

Cellular communication systems, such as the Global System for Mobile Communication (GSM), Universal Mobile Telecommunication System (UMTS), 3rd Generation Partnership Project (3GPP) Long-Term Evolution (LTE), and LTE-Advanced (LTE-A), provide a means of exchanging information between a mobile device and another node or device over a wireless mobile data network. The information exchanged may include voice service, data relevant to a user application residing on the mobile device, or control information relevant to the "housekeeping" (e.g., information exchanged on control channels for radio resource control) of the mobile device or the network to which it is connected.

Except for cases of circuit-switched voice service, the information exchanged is packet-based, which means that the resources for transmission and reception of user data are allocated dynamically over time. To facilitate this relatively on-demand asynchronous exchange of information, signaling protocols have been developed which enable a mobile terminal to connect to a wireless network, transfer information, and then disconnect from the wireless network. These sequences typically incorporate the concepts of a) network access, b) packet data transfer setup, c) packet data transfer, and d) release of resources, or packet session tear-down. This is traditionally referred to as the call oriented approach to data transfer.

Many applications produce fairly frequent, but small amounts of data traffic on the wireless network. Such small data transmissions, when triggered by large numbers of user equipment (UE) devices, may occur frequently enough to create a congestion condition on the control plane of a wireless network. Machine type communication (MTC) is one example of a situation where frequent small amounts of data traffic are generated. With the proliferation of MTC, the frequency of small data packet transmissions is increasing exponentially and hence the total amount of signaling in the network compared to data may be disproportionally high. Further, the small amounts of data traffic may emanate from UEs that are synchronized as well as from those that are not synchronized, in which case they will need to use random access procedures which may further cause congestion on the random access channel (RACH).

In some systems, the network moves the UE in and out of connected mode after each data burst. In these systems, the signaling sequence that is required to access the wireless network may result in extremely high signaling overhead (compared to the actual amount of data exchanged). In addition to resulting excessive signaling, these extra signaling messages also consume UE battery power disproportionately. One option to reduce connection establishment signaling is to hold the UE in long term connected mode. The current design of mobile communication systems to achieve high data rates and spectral efficiencies impose higher cost as well as result in higher power consumption in the device in connected mode due to the need to support more complex operations on both the control plane as well as the user plane. For example, in LTE systems, decoding the current physical downlink control channel (PDCCH) alone requires the devices to perform a search for their Downlink Control Information (DCI) amongst a large set of possibilities (e.g., 64 for 10 MHz) and the devices are expected to monitor the control channels while in connected mode. This procedure increases the complexity, cost, and power consumption at the UE.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 12 illustrates a channel identification index value for commands associated with a Low-Priority Channel (LPCH).

FIG. 16 illustrates a configuration information element for the LPCH.

FIG. 17 illustrates configuration field descriptions for the LPCH.

DETAILED DESCRIPTION

Figure 1:
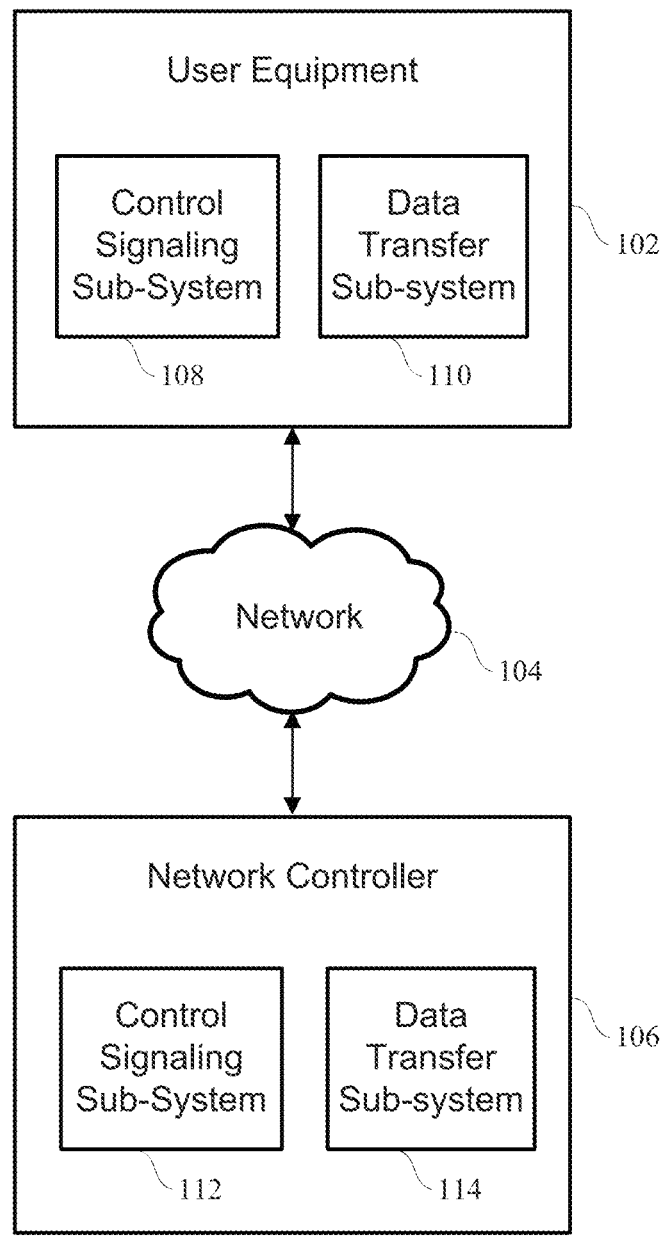
FIG. 1 illustrates a system with user equipment coupled with a network controller through a network connection.

Communication systems may use a Low-Priority channel (LPCH) introduced herein to support data communication across a network. In one implementation, the LPCH is a contention-free hyper-low rate channel with loose synchronization and that is self-contained through use of in-band control signaling. The features of the LPCH simplify the user equipment (UE) process for transmitting low volume delay tolerant data. The low-priority low-volume data transmission may be predictable, and range from frequent (e.g., less than hourly) to infrequent (e.g., hourly or longer) to very infrequent (e.g., monthly or longer). The use of LPCH is tailored for such low cost UEs with low priority data and hence the emphasis is on power consumption reduction and low signaling overhead for connections rather than latency or throughput.

The LPCH provides a slotted, repeating physical resource that requires very little overhead to set up and tear down. The LPCH may be unidirectional or bidirectional, and is optimized to carry small amounts of low-priority data, such as presence information or other machine-to-machine type information. The LPCH reduces or obviates the need for a separate control channel for some types of signaling by embedding most or all of the required control information within the LPCH itself. Additionally, the LPCH allows the system to create a long term shared channel allocation that can use the control functions of hybrid automatic repeat requests (HARQ), scheduling requests (SR), buffer status reports (BSR), and channel quality indications (CQI) as in-band signaling within the LPCH without the use of separate control channels after the LPCH has been established. This allows the system to apportion very low quantities of its resources to serve the very low priority data.

Retransmissions or feedback mechanisms (e.g., HARQ acknowledgements and negative-acknowledgements) in the LPCH are designed to not require any additional resources other than the LPCH (e.g., they may be performed through in-band signaling). The LPCH may be designed to provide a data channel whose entire control function is completely contained within the same channel after the LPCH is set up. As such, the in-band signaling of the LPCH is a good fit for low priority, low volume traffic applications. Using configurations at the UE and a network controller (e.g., an Evolved Node B, referred to as an eNB), the self-contained signaling used by the LPCH may still be encoded (and subsequently decoded) more robustly than data within other previously configured allocations. In some embodiments, the network controller function of this invention may be embodied in another UE.

The LPCH is designed to carry both data (e.g., user plane data) and signaling for small infrequent or periodic transmissions. The amount of resources available to a UE in the LPCH depends on the amount of data that needs to be sent, and can be scaled in the time axis to keep the resources per unit time that an eNB has to expend under check. For example, given 10,000 UEs transmitting low priority data, 1 Resource Block (RB) in every frame of 10 milliseconds duration for the LPCH channel may be used to serve 10,000 UEs with a latency of less than an hour using only 0.2% of resources of a 10 MHz LTE system. The LPCH with its in-band signaling capability eliminates the need for a separate control channel during data transfer and also reduces overall control channel overhead required to serve a large number of UEs with low priority data.

The LPCH implementations described herein may be relevant to Machine Type Communication (MTC). For example, the LPCH may be helpful to reduce the signaling overhead associated with the proliferation of MTC, especially for MTC of small low priority data packets. Machine type traffic encompasses a wide variety of traffic but may be considered to be traffic that is generated and consumed without much user interaction. MTC is expected to generate a significant amount of wireless traffic in the near future. MTC traffic may fall into various categories from highly delay sensitive and frequent transmissions (e.g., medical sensor reports) to highly delay tolerant infrequent transmissions of small data packets (e.g., smart meter readings). Although the LPCH is relevant to the issues of MTC, it is also relevant to other communication devices, applications, and technologies. For example, the LPCH may also be applied to devices such as smartphones, for which the LPCH benefits would be particularly relevant with regard to the quality of service requirements of the associated applications running on the smartphones.

FIG. 1 illustrates a system with user equipment 102 coupled with a network controller 106 through a network connection 104. The user equipment 102 may serve to terminate a communication session for a user. The user equipment 102 may be a mobile device or wireless device, such as a mobile telephone, smartphone, tablet, personal digital assistant, handheld or laptop computer, or another device that has telecommunications capabilities. In other cases, the user equipment 102 may be a device that is not transportable, such as a desktop computer, set-top box, smart meter (e.g., a gas or electricity utility usage meter with wireless communication capabilities), or network appliance. The network controller 106 may be a base station, network node (such as an eNB in an LTE network), wireless access point, or any other component of the wireless network. In another implementation, the network controller 106 may be resident to another user equipment device, such as in a device-to-device communication network.

The network 104 enables the user equipment 102 and the network controller 106 to exchange data and control messages. The user equipment 102 includes a control signaling sub-system 108 and a data transfer sub-system 110. Similarly, the network controller 106 includes a control signaling sub-system 112 and a data transfer sub-system 114. The control signaling sub-systems 108 and 112 may be programmed to create control signaling messages to control how the parties handle the data exchanges. For example, the control signaling sub-systems 108 and 112 may exchange control signal messages to set up the LPCH introduced herein, modify the parameters of the LPCH after setup, or transfer other control information through the LPCH. In one implementation, the control signaling sub-systems 108 and 112 send control signals across traditional control channels to set up and establish the LPCH, but then send all subsequent control messages as in-band signals in the LPCH until the LPCH is torn down. The data transfer sub-systems 110 and 114 may be programmed to create data packets to transmit information from a data storage buffer. Both data packets and control signals may be transferred between the user equipment 102 and the network controller 106 on the same channel, such as the LPCH, through the network 104.

Figure 2:
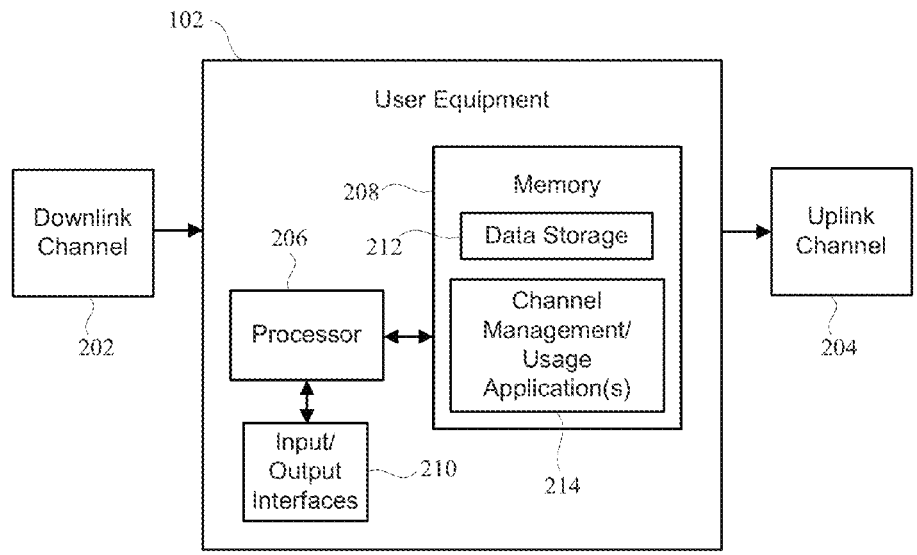
FIG. 2 illustrates user equipment communicating through an uplink channel and a downlink channel.

FIG. 2 illustrates user equipment 102 communicating through a downlink channel 202 and an uplink channel 204. The user equipment 102 receives data and control signals from one or more communication partners (e.g., the network controller 106 of FIG. 1) through the downlink channel 202. The user equipment 102 also transmits data and control signals to one or more communication partners (e.g., the network controller 106 of FIG. 1) through the uplink channel 204. The uplink and downlink channels 202 and 204 used by the user equipment 102 may be instances of the LPCH introduced herein. Alternatively, one of the uplink or downlink channels 202 and 204 may be an LPCH while the other is a traditional data transfer channel.

The user equipment 102 includes one or more processors 206, one or more memory devices 208, and one or more input/output interfaces 210. The input/output interfaces 210 may be used to connect the user equipment 102 with other devices or networks. The processor 206 may be a computer processor implemented as a central processing unit (CPU), microprocessor, microcontroller, application specific integrated circuit (ASIC), or a combination of circuits. In one implementation, the processor 206 is a specialized microprocessor with an architecture optimized for a specific application, such as a wireless channel management application, or a specific device, such as a mobile communication device (e.g., a smartphone, tablet computer, or smart meter). The memory device 208 may include a magnetic disc, an optical disc, RAM, ROM, DRAM, SRAM, Flash and/or any other type of computer memory. The memory device 208 is communicatively coupled with the computer processor 206 so that the computer processor 206 can access data stored on the memory device 208, write data to the memory device 208, and execute programs and modules stored on the memory device 208.

The memory device 208 includes one or more data storage areas 212 and one or more programs. The data and programs are accessible to the computer processor 206 so that the computer processor 206 is particularly programmed to implement the channel management and usage functionality of the LPCH system. The programs may include one or more modules executable by the computer processor 206 to perform the desired channel management and usage functions. For example, the program modules may include one or more channel management/usage applications 214 that set up, manage, and use the LPCH. The channel management/usage applications 214 may include one or more data source applications that generate data for transfer through the uplink channel 204. The channel management/usage applications 214 may include one or more management applications that control the transmission of the source application data, such as by sending and receiving control signals with other communication partners. The memory device 208 may also store additional programs, modules, or other data to provide additional programming to allow the computer processor 206 to perform the functionality of the user equipment 102. The described modules and programs may be parts of a single program, separate programs, or distributed across multiple memories and processors. Furthermore, the programs and modules, or any portion of the programs and modules, may instead be implemented in hardware or circuitry.

Figure 3:
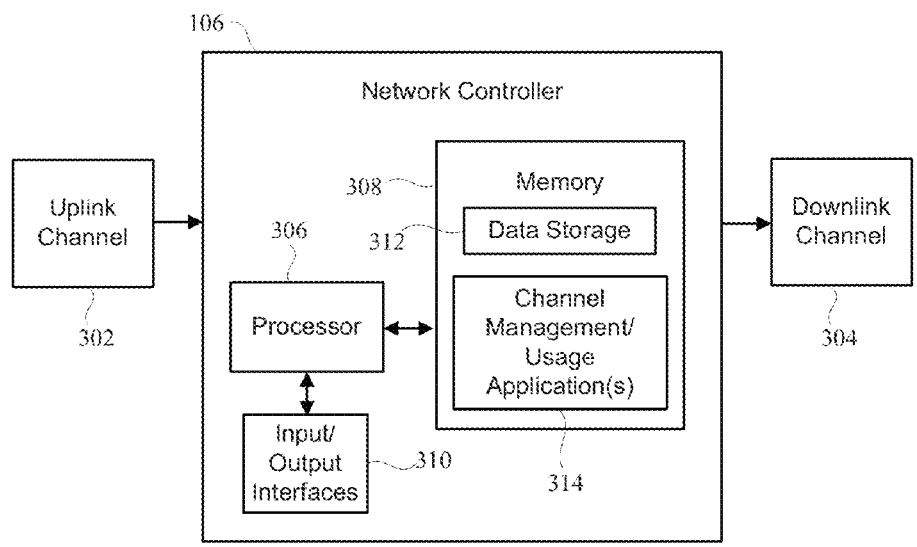
FIG. 3 illustrates a network controller communicating through an uplink channel and a downlink channel.

FIG. 3 illustrates a network controller 106 communicating through an uplink channel 302 and a downlink channel 304. The network controller 106 receives data and control signals from one or more communication partners (e.g., the user equipment 102 of FIG. 1) through the uplink channel 302. The network controller 106 also transmits data and control signals to one or more communication partners (e.g., the user equipment 102 of FIG. 1) through the downlink channel 304. The uplink and downlink channels 302 and 304 used by the network controller 106 may be instances of the LPCH introduced herein. Alternatively, one of the uplink or downlink channels 202 and 204 may be an LPCH while the other is a traditional data transfer channel. FIG. 3 includes one or more processors 306, one or more memory devices 308 (including one or more data storage areas 312 and one or more programs, such as the channel management/usage application(s) 314), and one or more input/output interfaces 310. The descriptions above regarding the structure and function of components 206, 208, 210, 212, and 214 in connection with FIG. 2 are incorporated herein for the corresponding components 306, 308, 310, 312, and 314 of FIG. 3. However, the operation of the components in FIG. 3 is from the perspective of the network controller 106 instead of the user equipment 102.

Figure 4:
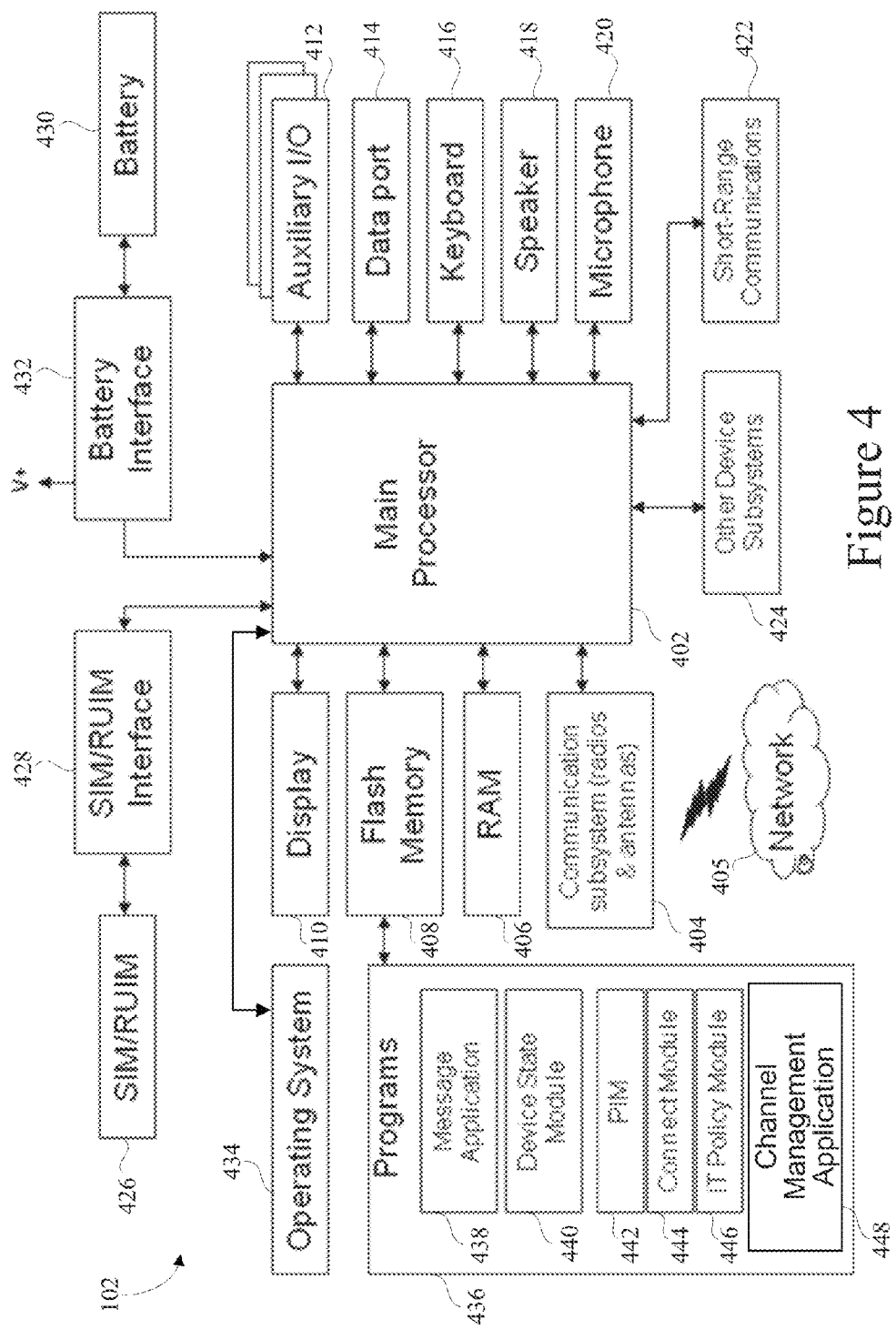
FIG. 4 illustrates additional details of one implementation of user equipment.

FIG. 4 is a block diagram of one implementation of the user equipment 102 programmed with a channel management application that sets up, manages, and/or uses the LPCH. The user equipment 102 includes a number of components, such as a main processor 402 that controls the overall operation of the user equipment 102. Communication functions, including data and voice communications, are performed through a communication subsystem 404. The communication subsystem 404 receives messages from and sends messages to wireless network 405. The communication subsystem 404 may be configured in accordance with Universal Mobile Telecommunications System (UMTS) technology using the UMTS Terrestrial Radio Access Network (UTRAN) or Long Term Evolution (LTE) technology using Evolved UTRAN (E-UTRAN). Alternatively, the communication subsystem 404 may be configured in accordance with the Global System for Mobile Communication (GSM) and General Packet Radio Services (GPRS) standards. In other implementations, the communication subsystem 404 may be configured in accordance with other mobile communication protocols. The wireless link connecting communication subsystem 404 with wireless network 405 represents one or more different radio frequency (RF) channels, operating according to defined protocols specified for the particular communication technologies being employed. These channels may be capable of supporting both circuit switched voice communications and packet switched data communications. The wireless link also supports the LPCH introduced herein.

Other wireless networks also may be associated with the user equipment 102 in various implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE and UMTS, fourth-generation (4G) networks, and Long Term Evolution (LTE) networks. Examples of other voice-centric data networks include Personal Communication Systems (PCS) networks like GSM and Time Division Multiple Access (TDMA) systems.

Main processor 402 interacts with additional subsystems such as random access memory (RAM) 406, flash memory 408, display 410, auxiliary input/output (I/O) subsystem 412, data port 414, keyboard 416, speaker 418, microphone 420, short-range communications 422, and other device subsystems 424. Some of the subsystems of the user equipment 102 perform communication-related functions, whereas other subsystems may provide resident or on-device functions. For example, display 410 and keyboard 416 may be used for both communication-related functions, such as entering a text message for transmission over network 405, and device-resident functions such as a calculator or task list or the channel management system.

The user equipment 102 may send and receive communication signals over wireless network 405 after required network registration or activation procedures have been completed. Network access may be associated with a subscriber or user of the user equipment 102. To identify a subscriber, the user equipment 102 may use a SIM card/RUIM 426 (i.e., Subscriber Identity Module or a Removable User Identity Module) to be inserted into a SIM/RUIM interface 428 in order to communicate with a network. SIM card or RUIM 426 is one type of a conventional smart card that can be used to identify a subscriber of the user equipment 102 and to personalize the user equipment 102, among other things. SIM card/RUIM 426 may include a processor and memory for storing information. The SIM card/RUIM 426 may enable a subscriber to access subscribed service, such as web browsing and messaging such as e-mail, voice mail, Short Message Service (SMS), and Multimedia Messaging Services (MMS), point of sale, field service, and sales force automation. Once SIM card/RUIM 426 is inserted into SIM/RUIM interface 428, it is coupled to main processor 402. As an alternative to the SIM card/RUIM 426, user identification information may be programmed into flash memory 408.

The user equipment 102 may be a battery-powered device that includes battery interface 432 for receiving one or more rechargeable batteries 430. In at least some embodiments, battery 430 may be a smart battery with an embedded microprocessor. Battery interface 432 may be coupled to a regulator, which assists battery 430 in providing power V+ to the user equipment 102. Although current technology makes use of a battery, future technologies, such as micro fuel cells or photovoltaic cells, may provide the power to the user equipment 102.

The user equipment 102 also includes operating system 434 and other programs 436. Operating system 434 and programs 436 may be implemented as software components that are run by main processor 402. Operating system 434 and programs 436 typically are stored as program code on a media readable by a processor, such as main processor 402. Such readable storage media may include a persistent storage device, such as flash memory 408, which may alternatively be a read-only memory (ROM) or similar storage element. Those skilled in the art will appreciate that portions of operating system 434 and programs 436, such as specific device applications, or parts thereof, may be temporarily loaded into a volatile storage device, such as RAM 406. Other software components also may be included, as is well known to those skilled in the art.

Programs 436 that control basic device operations, including data and voice communication applications, will normally be installed on the user equipment 102 during its manufacture. Other programs 436 include message application 438. Message application 438 can be any suitable software program that allows a user of the user equipment 102 to send and receive electronic messages. Messages that have been sent or received by the user are typically stored in flash memory 408 of the user equipment 102, or some other suitable storage element in the user equipment 102. In some implementations, some of the sent and received messages may be stored remotely from the user equipment 102, such as in a data store of an associated host system.

Programs 436 may further include device state module 440, Personal Information Manager (PIM) 442, and other suitable modules. Device state module 440 provides persistence, i.e., device state module 440 ensures that some device data is stored in persistent memory, such as flash memory 408, so that the data is not lost when the user equipment 102 is turned off or loses power. PIM 442 includes functionality for organizing and managing data items of interest to the user, such as, but not limited to, e-mail, contacts, calendar events, voice mails, appointments, and task items. The user equipment 102 also includes connect module 444, and IT policy module 446. Connect module 444 implements the communication protocols that are used by the user equipment 102 to communicate with the wireless infrastructure and any host system, such as an enterprise system. Connect module 444 may include a set of Application Program Interfaces (APIs) that can be integrated with the user equipment 102 to allow the user equipment 102 to use any number of services associated with an enterprise system. IT policy module 446 receives IT policy data that encodes the IT policy. IT policy module 446 then ensures that the IT policy data is authenticated by the user equipment 102. The IT policy data can then be stored in flash memory 406 in its native form. Other types of programs or software applications also may be installed on the user equipment 102. These software applications may be third party applications, which are added after the manufacture of the user equipment 102. Examples of third party applications include games, calculators, utilities, and the like.

The user equipment 102 is also programmed with a channel management application 448 that enables the user equipment 102 to set up and control the usage of the LPCH for data transfers to and/or from the user equipment 102. The channel management application 448 may include one or more stand-alone modules, or may be implemented, in whole or in part, as part of another module. The channel management application 448 may be executed by the processor 402 when necessary to set up or control the usage of the LPCH for data transfers.

Figure 5:
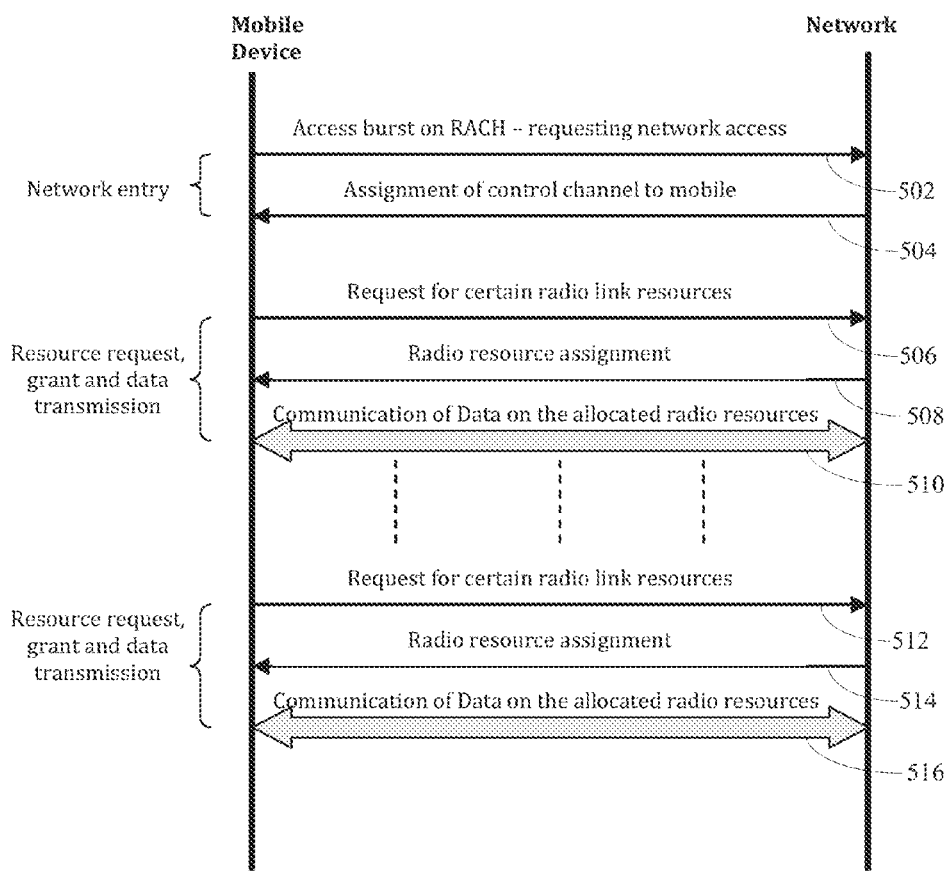
FIG. 5 illustrates a signaling sequence to enable wireless transmission of data between user equipment and a network controller.

FIG. 5 illustrates a signaling sequence to enable wireless transmission of data between user equipment (e.g., a mobile device) and a network controller. The implementation of FIG. 5 illustrates a LTE signaling sequence. In most systems, such as GSM, UMTS and LTE derivatives, the user equipment initiates the network access via the Random Access procedure and this procedure gives the network an idea of the identity of the user equipment, upon which the network can assign radio resources to that mobile device for subsequent data transfer.

In the signaling sequence of FIG. 5, the user equipment initiates a network entry with a request for network access 502 on the RACH. The network responds with an assignment 504 of a control channel to the user equipment. When the user equipment is ready to transfer data to the network, the user equipment will send a request 506 on the control channel to the network requesting certain radio link resources. The network will respond with an assignment 508 of radio resources to the user equipment. The user equipment and network may then communicate 510 using the assigned radio resources. When the user equipment has another data transfer need, then the user equipment and network may negotiate another data transfer allocation through steps 512, 514, and 516. Thus, in the example of the resource requests, grants, and data transmissions illustrated by steps 506, 508, 510, 512, 514, and 516, the user equipment and network communicate using control channels to set up the data channel in a traditional manner. However, at least some of this signaling sequence or functionality could be modified by using the self-contained LPCH procedures and in-band control signaling after the LPCH is setup by the user equipment and network, as discussed below in connection with FIG. 7.

Figure 6:
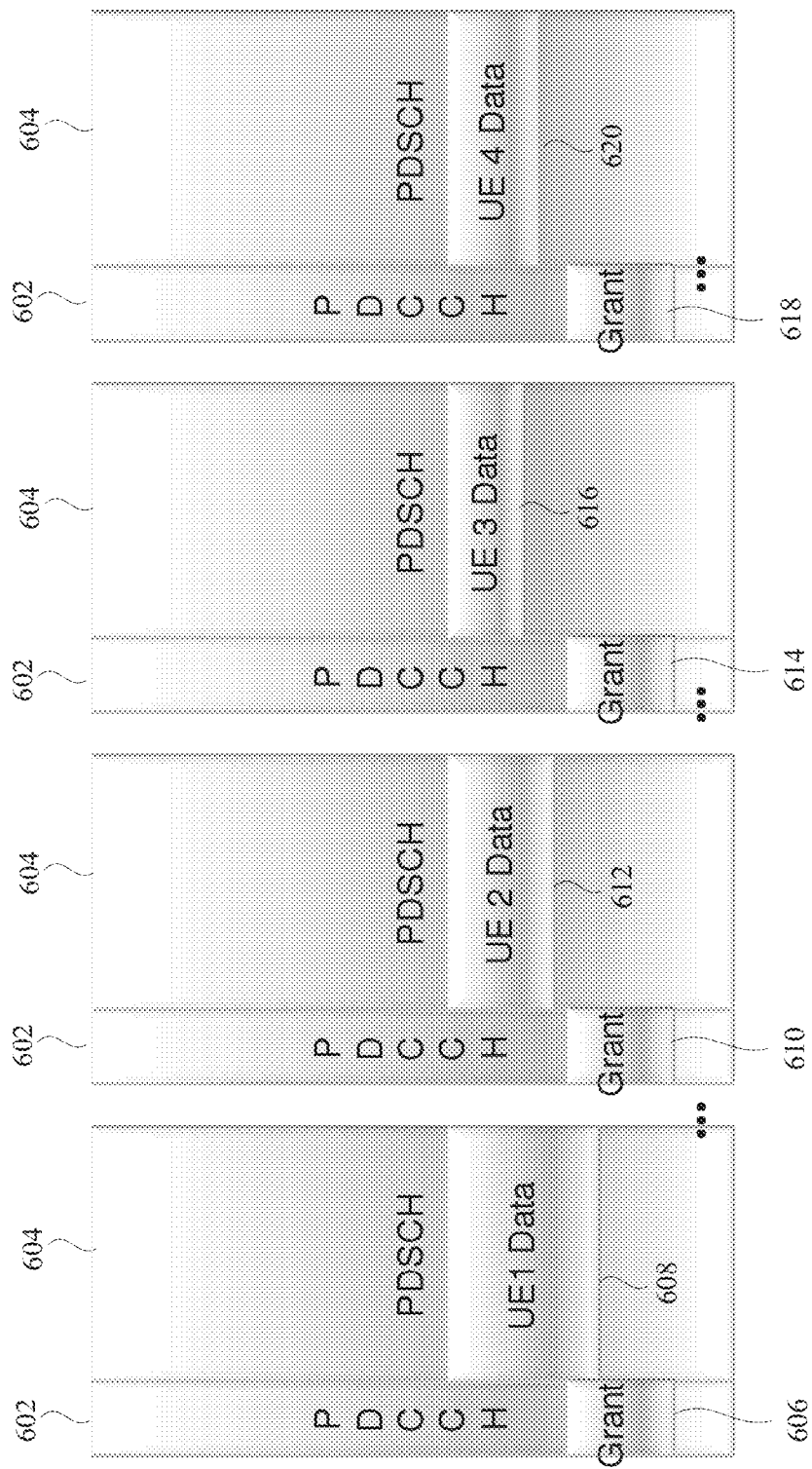
FIG. 6 illustrates downlink data grants in a control channel of a LTE system.

FIG. 6 illustrates downlink data grants in a control channel of a LTE system. Specifically, FIG. 6 shows how low data rate, low priority bursts of data may be treated in LTE using separate control channels instead of using the in-band signaling of the self-contained LPCH introduced herein. FIG. 6 illustrates a physical downlink control channel (PDCCH) 602 and a physical downlink shared channel (PDSCH) 604 used by multiple user equipment devices (labeled UE1-UE4).

In the implementation of FIG. 6, the network assigns small downlink grants 608, 612, 616, and 620 for each of the user equipment devices UE1-UE4. The data grants 608, 612, 616, and 620 indicate the scheduled downlink transmission for that UE, separated by long periods where no grants are needed (due to the low frequency of the data). While the grants can be tailored to fit the data requirements of the UEs, the system still incurs the overhead of a control channel grant in each subframe that has data addressed to the given UE. Similarly, uplink grants 606, 610, 614, and 618 are assigned per UE on the PDCCH for future uplink transmission. This requires the UE to periodically monitor the PDCCH for such grants, which results in unnecessary power consumption at the UE.

Discontinuous reception (DRX) allows the system to configure the UE to be actively receiving periodically in a discontinuous fashion. In the LTE system, the power consumption of a user device in connected mode may be reduced by use of DRX time-domain patterns (known to both the UE and the eNB) defining whether or not the UE is expected to activate its receiver and monitor a given subframe for the presence of downlink or uplink assignments on PDCCH.

During those subframes where the UE is not expected to activate its receiver, user-plane communications are not possible in the downlink and the UE may enter a DRX mode to reduce its power consumption. The DRX patterns and duty cycles (active reception/sleep) vary according to the operation of certain timers, some of which are triggered by data activity. In particular, a DRX inactivity timer is reset to an initial value and restarted each time an assignment is received (via PDCCH) for a new uplink or downlink data packet. While the timer is running, the UE is expected to actively monitor all downlink subframes. When the timer expires (i.e. there have been no uplink or downlink assignments for new data for a defined period of time), the DRX pattern may change in order to allow the UE to sleep for an increased proportion of subframes. Thus, during times of data inactivity, UE power consumption may be reduced. However the UE is still expected to use control channels of physical uplink control channel (PUCCH) and monitor the PDCCH (although less frequently). Furthermore, the DRX ON and OFF times are not fixed and the ON time is extended as long as there are pending HARQ retransmissions. Therefore, even small data transmissions incur variable spectrum cost of control channel due to PDCCH and PUCCH allocations as well as power cost due to the UE being required to monitor the downlink control channels.

Figure 7:
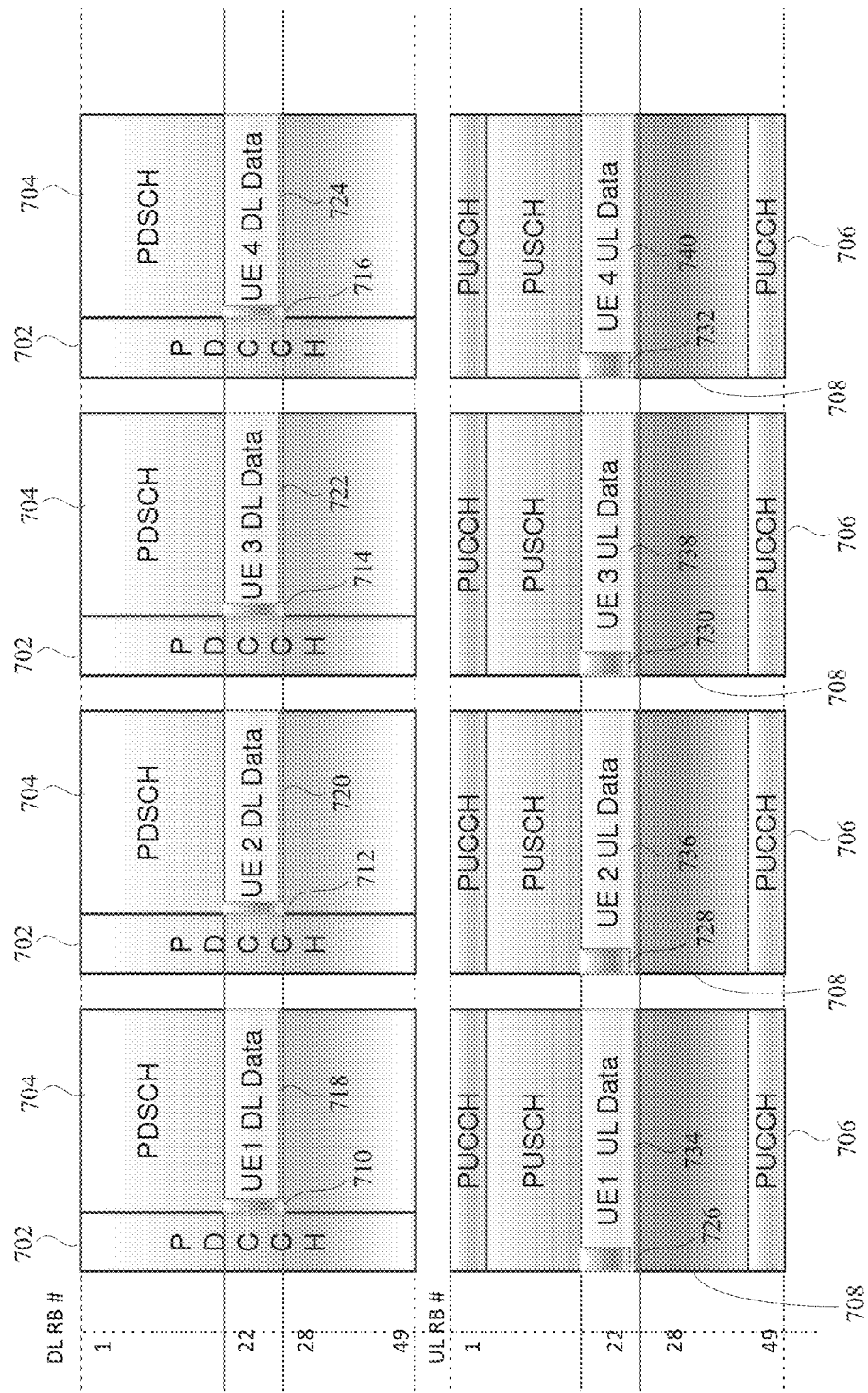
FIG. 7 illustrates self-contained data channels with in-band signaling.

FIG. 7 illustrates the use of self-contained data channels with in-band signaling. Specifically, FIG. 7 illustrates the use of the LPCH introduced herein for uplink and downlink data transfer. FIG. 7 illustrates a downlink and uplink control and data channels, including PDCCH 702, PDSCH 704, PUCCH 706, and PUSCH 708. The channels are used by multiple user equipment devices (labeled UE1-UE4). In the implementation of FIG. 7, the network assigns small downlink grants (i.e., data transfer resources) 718, 720, 722, and 724 on the PDSCH 704 for each of the user equipment devices UE1-UE4. The network also assigns small uplink grants (i.e., data transfer resources) 734, 736, 738, and 740 on the PUSCH 708 for each of the user equipment devices UE1-UE4. The data grants indicate the scheduled downlink and uplink transmission for that UE, separated by long periods where no grants are needed (due to the low frequency of the data).

In FIG. 7, the LPCH implementation is shown as already having been set up for uplink and downlink communication between the UEs and a network controller. In one implementation, the UEs and network controller set up the LPCH implementation of FIG. 7 by exchanging control messages over traditional control channels. For example, to initially set up the LPCH between UE1 and the network controller, UE1 may send a request for resources over an uplink control channel to the network controller. This message may be similar to requests 506 and 512 of FIG. 5. In response, the network controller will determine what resources are necessary for UE1's desired communication traffic. The UE may explicitly request a LPCH channel to be setup or the network controller may decide that an LPCH channel is appropriate based on some predetermined set of rules. These rules may include determination of: a type of the device requesting the resources, a type of application requesting the resources, knowledge of the data rates/frequencies of data exchange, device location, subscription type, time of day, congestion/traffic rate in the cell, and the like. If LPCH is deemed to be appropriate for the intended traffic, then the network controller will assign resources to UE1 according to the LPCH configuration. The network controller will then notify UE1 of the assigned resources through a control signal in the downlink control channel. This message may be similar to assignment notifications 508 and 514 of FIG. 5, but will be modified to include the necessary details to instruct UE1 to perform future operations according to the LPCH implementation, such as sending subsequent control messages as in-band signaling within the data grant of the self-contained shared data channel. The configuration information element for the LPCH is shown and described in FIGS. 16 and 17.

In the implementation of the LPCH of FIG. 7, after the LPCH is set up, all subsequent control signaling occurs in-band in the PDSCH 704 and/or the PUSCH 708. For example, FIG. 7 illustrates in-band control signals 710, 712, 714, and 716 in the PDSCH 704 and in-band control signals 726, 728, 730, and 732 in the PUSCH 708. In the implementation of FIG. 7, the PDCCH 702 and PUCCH 706 are not used for the control signals exchanged between the UE and network controller. Thus, control signals are exchanged without using a separate control channel (e.g., the PDCCH 702 and PUCCH 706) between set-up and tear-down of the self-contained data channel (e.g., the LPCH implementation of the PDSCH 704 and PUSCH 708). A single grant that contains all signaling in the LPCH allows the system to significantly simplify the UE processing requirements. In some cases, the UE using LPCH may activate its radio frequency font end and its inverse fast Fourier transforms to receive and transmit only in the part of the sub band where the LPCH allocation is configured. For example, a UE that has an LPCH grant contained in the center six Resource Blocks (RBs) of the band, can significantly reduce its communications processing by receiving and transmitting data in only those RBs at the prescribed times. This will simplify the receiver processing requirements and hence associated complexity. FIG. 7 illustrates an example where the LPCH is allocated in the center 6 RBs of a LTE deployment with 50 total available RBs in the uplink and downlink channels.

The use of LPCH may reduce the dynamic overhead required for flexible data transmission. As such, in one implementation, the dynamic allocations are not used for LPCH grants. Instead, LPCH grants may have fixed patterns (e.g., periodic) with long durations expected between successive grants. As one example, the recurrence of grants may be several minutes apart or hours apart for smart meter applications. The LPCH grants may be provided for both uplink and downlink. The allocations are expected to be set for long periods of time. Because the data carried in them is highly latency tolerant, the lack of a prompt grant is acceptable. The periodicity of the grant may be chosen such that there is a high probability that some data is available (either in downlink or uplink) and is awaiting transmission when the channel is available. This increases the utilization of these allocated resources. In some examples, this periodicity can be chosen based on the application type (e.g., smart meter applications sending periodic updates at known intervals/periodicities), device type, device location, subscription type (e.g., subscribers paying higher tariffs could be allocated a channel with more frequent resources), time of day, congestion/traffic rate in the cell, and the like.

In many cases the fixed periodicity mechanism is appropriate because the applications involved are the type for which the periodicity can be predicted accurately due to known transmission schedules, such as in smart meters. Since the allocation of the channel is periodic and configured such that there is no contention, there is no need for dynamic signaling of grants in case of LPCH. This significantly reduces the PDCCH and PUCCH (e.g., scheduling request) resource load compared to the current dynamic way in which resources are allocated in case of LTE.

The system may configure the LPCH periodic resources by specifying the allocated RBs and the periodicity of the grant.

In some cases, the connected mode UEs that have low priority data may be configured to use specific RBs and periodicity for uplink and/or downlink by using radio resource control (RRC) messages for initial setup. FIG. 7 illustrates one implementation of the LPCH in a LTE system. In this case, the system avoids the control channel grant overhead as compared to the system shown in FIG. 6.

The allocated resource may be an appropriately sized chunk of time, frequency, and code orthogonal to other allocations. Also, the periodicity of the resource may be chosen to ensure maximum utilization, such that data is likely to be ready for transmission when the grant becomes available for the UE. However, if the UE has no data in downlink or uplink, the resource may be left unused. In this case, the UE may be allowed to send feedback information like channel quality reports or other such information instead of leaving the resource unused. The network controller (e.g., eNB) can further track the UE transmissions and the resource utilization and thus can adapt the resource allocation and its periodicity to the UE.

In some cases, in order to avoid unnecessary radio link control (RLC) headers and associated signaling overheads, the LPCH data bearers may be mapped into RLC transparent mode (TM), where Automatic Repeat Request (ARQ) is disabled and it is left to the higher layer protocols to detect errors. Note however, that signaling RBs may still use RLC acknowledged mode (AM).

Although FIG. 7 illustrates the grants in uplink and downlink as symmetric, in some implementation, the uplink allocations may be more numerous than the downlink allocations, or vice versa. Asymmetric allocations may be used for applications with asymmetric traffic. For example, a smart meter may require a small set of uplink allocations every few hours and even less frequent downlink allocations. For such allocations, the timing and size of the grants may incorporate sufficient robustness to not require HARQ retransmissions, CQI indications, or timing corrections.

The current LTE system is designed around the premise that connected mode is used only for UEs with immediate data activity. Therefore, a common assumption is that on entering RRC connected mode, a user will be semi-statically assigned (usually for the duration of the connected mode stay) dedicated scheduling request (SR) resources on PUCCH for the purposes of informing the eNB of the UEs need to transmit data on PUSCH, subsequent to a new arrival of data and having previously had an empty transmission buffer. The current LTE system also allows the UE to use physical random access channel (PRACH) resources to send the scheduling requests.

In case of LPCH, the uplink data is semi-statically scheduled and is available for the UE to send its data whenever the resource is available. If the available resource does not empty the UL buffer, the UE may include a medium access control (MAC) buffer status report (BSR) header field in the transmitted data burst. The BSR may be sent as an in-band signal within the LPCH. The BSR may indicate to the network that there is more data available to send and the network may choose to increase the size of the LPCH resource at the next available resource. While this mechanism will have a higher latency than a scheduling request, the applications targeted by the LPCH may not need low latency. The overall system resources may be better used for more latency sensitive applications or UEs due to the saved scheduling request and PUCCH resources.

In some cases, the uplink resources reserved for UE CQI feedback could be eliminated as well by using robust modulation and coding format and relying on higher layer error control. Alternatively, the CQI feedback may be sent punctured in the physical layer resources that carry the LPCH data allocation or in a new CQI MAC CE (shown in FIG. 15) that can be sent along with data in the LPCH data allocation. The scheme of which physical layer resources carry the control information and which resources carry the data information can be set up during the setup of the LPCH and modified using in band signaling. The channel quality reports are only valid for a limited duration of time. This is typically dependent on the coherence time of the channel which in turn depends on the speed of the UE. For LPCH channels with very large periodicities, the CQI reporting may not be as useful. However, for LPCH channels with shorter repeating periodicities, CQI reporting may be considered. Thus, the eNB may choose to switch the CQI reporting ON or OFF for an LPCH channel based on the periodicity of the channel. This may be based on a set of predetermined rules, may be dynamically configured by the network, or may be implicitly linked to the periodicity of the LPCH channel and/or the UE speed.

Figure 8:
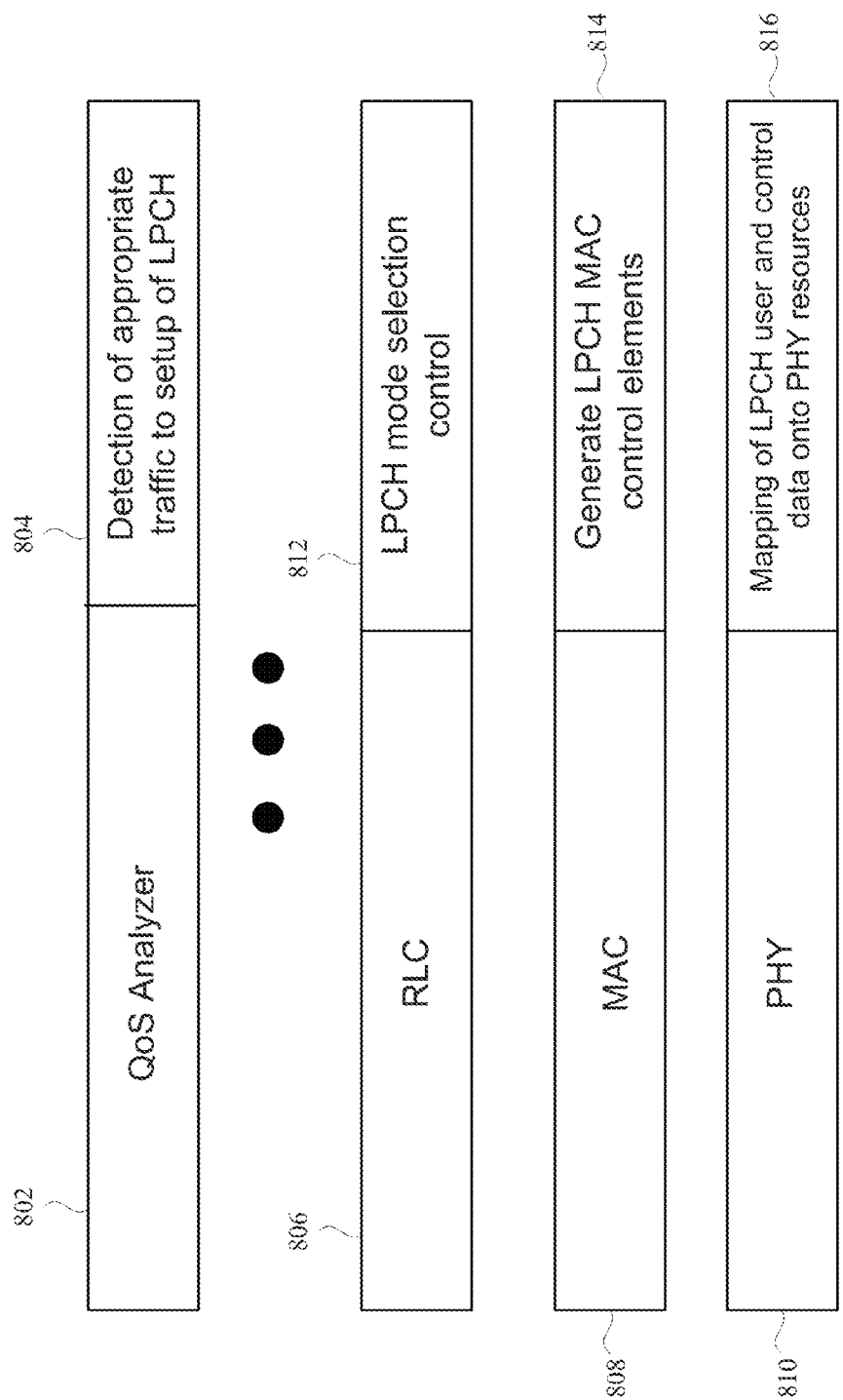
FIG. 8 illustrates a quality of service channel selection mechanism.

FIG. 8 illustrates a quality of service channel selection mechanism. For example, a quality of service (QoS) analyzer 802 may determine whether to set up or use the LPCH or a standard higher priority channel structure to transfer data. For example, at step 804, the QoS analyzer 802 detects the traffic and sets up the LPCH, if the traffic is appropriate for the LPCH. When the application, or its proxy, sets the quality of service to indicate (1) low priority, and (2) small data size (e.g., less than 64 octets or some other predetermined or dynamic threshold), the quality of service analyzer 802 detects this condition and selects the appropriate radio bearer (i.e., LPCH in this case). If the quality of service data indicated a higher priority or a larger data size, then the quality of service analyzer 802 may select a standard channel to carry the data traffic. FIG. 8 also shows a radio link control (RLC) layer 806 performing LPCH mode selection control at step 812, a medium access control (MAC) layer 808 generating LPCH MAC control elements at step 814, and a physical (PHY) layer 810 mapping LPCH user and control data onto physical resources at step 816.

Figure 9:
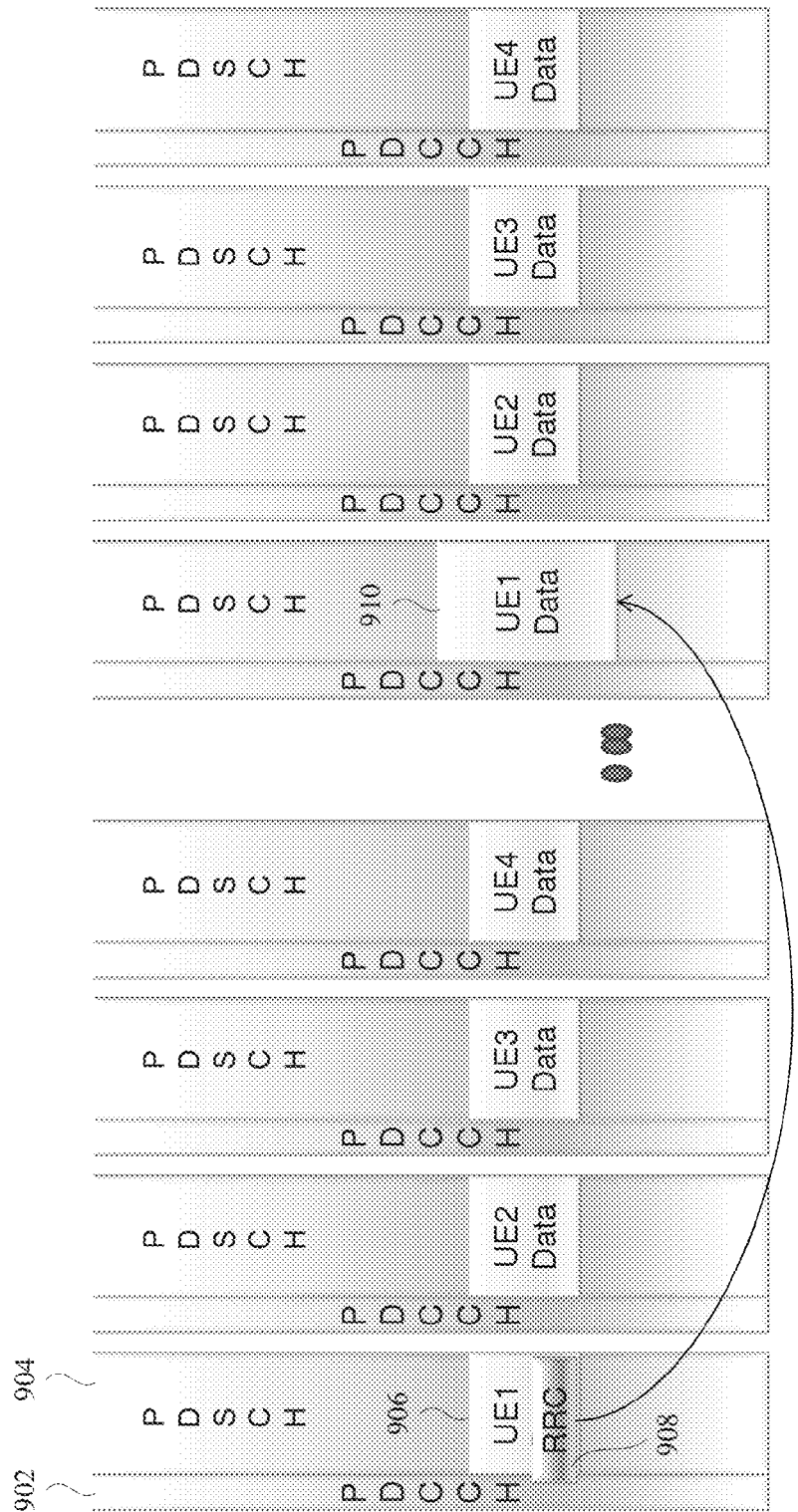
FIG. 9 illustrates a modification to an allocated data transfer resource.
Figure 13:
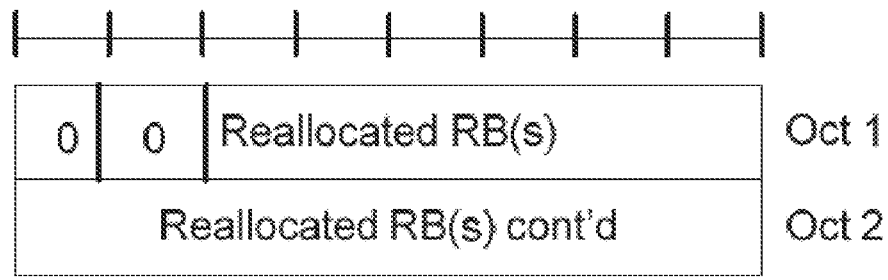
FIGS. 13-15 illustrate examples of control elements relevant to the LPCH.

FIG. 9 illustrates a modification to an allocated data transfer resource. In some implementations, after the initial connection setup there is no need to expend dynamic downlink signaling resources for the low priority, low volume applications that are using the LPCH. Further changes to the data transfer allocations (e.g., providing additional number of resources or changing the periodicity of resources) may be indicated in additional in-band signaling messages that are sent in the previously allocated LPCH resource. This in-band signaling for resource modification requests and grants eliminates the need for new downlink indications in the PDCCH from the eNB. FIG. 9 illustrates a PDCCH 902 and a PDSCH 904. UE1 is initially allocated a data grant 906. FIG. 9 shows how the allocation for UE1's LPCH is changed by sending an in-band signaling message 908 in the previous allocation for UE1 in the LPCH. The signaling message 908 changes the initial data grant 906 into a new data grant 910 that is different than the initial data grant 906. The signaling message 908 provides an identification of the new data grant 910 to UE1. The new data grant 910 may be a completely new data grant or a modified version of the previous data grant. In the implementation of FIG. 9, the new data grant 910 is larger than the initial data grant 906. The LPCH is therefore not constrained to be uniform for all UEs or subframes. The allocation may be conveyed in a MAC Control Element (CE) or an RRC signal (e.g., information element or message). In some implementations, the MAC message defined in FIG. 13 is used to reallocate the RBs using the RB assignment bits otherwise sent in the PDCCH DCI and the periodicity for LPCH. In some cases, the grant may be punctured in the REs of the LPCH RBs. This would allow the grant to be coded more robustly than the data.

Figure 10:
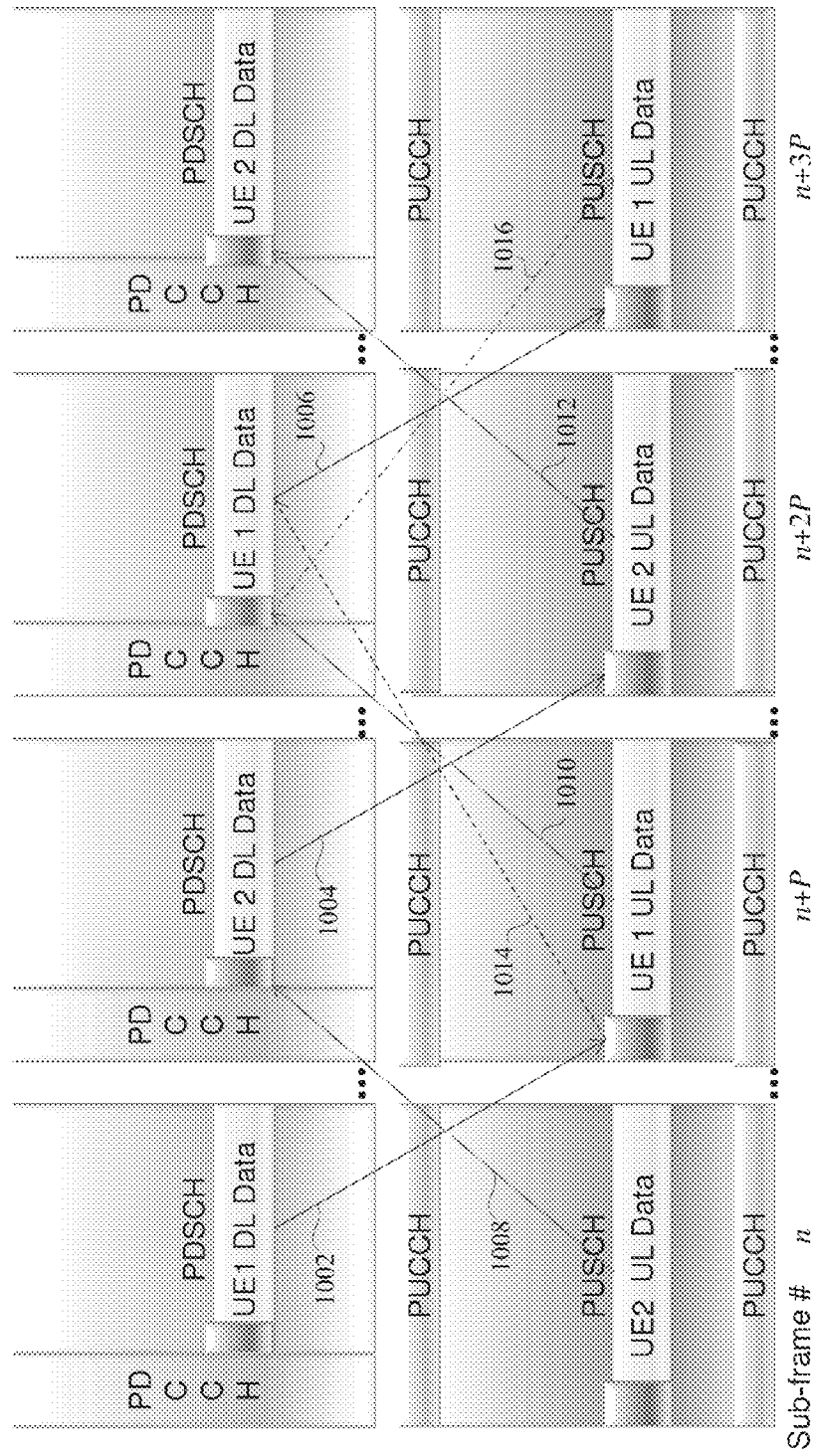
FIG. 10 illustrates self-contained data channels with in-band signaling to implement a hybrid automatic repeat request (HARQ) acknowledgement and negative-acknowledgement exchange.

FIG. 10 illustrates self-contained data channels with in-band signaling to implement a hybrid automatic repeat request (HARQ) acknowledgement (ACK) and negative-acknowledgement (NACK) exchange. HARQ is the process of combining (in a receiver) a first version of a signal with a second (retransmitted) version of a signal, and subsequently attempting to decode the combined signal. HARQ is a physical layer mechanism that is used in a number of mobile communication systems to improve the reliability and efficiency of the layer 1. This is distinct from ARQ in which the first and second versions are not combined. In the LTE system, positive or negative acknowledgements of uplink transmissions are transmitted by the eNB on a downlink physical channel termed the Physical Hybrid ARQ Indicator Channel (PHICH). Synchronous HARQ is used in LTE uplink, meaning that a retransmission (triggered in the UE by receipt of NACK on PHICH from the eNB) is sent on the same uplink resources (as the previous failed transmission) after a predetermined time period has elapsed since receipt of the NACK. The NACK on PHICH therefore implicitly reallocates the uplink resources for the purposes of the retransmission. The control information related to HARQ ACK/NACK in uplink is either sent on the PUCCH or the information is multiplexed with the data on the PUSCH when PUSCH transmission is present.

In some implementations, it is possible to eliminate the signaling channel resources reserved for HARQ ACK/NACK allowing the higher layers to deal with error control. While this may lead to inefficiencies in lower layers, and the need for additional functions in the higher layers, it eliminates the associated control channel overhead.

Alternatively, in other implementations (e.g., the implementation of FIG. 10), HARQ ACK/NACK may be sent in-band in the LPCH data allocation in a new ACK/NACK MAC CE. In some cases, the DL and UL HARQ ACK/NACK is punctured in the resource elements inside the UL and DL LPCH resource blocks respectively. As such, the HARQ protocol as in LTE is altered in case of LPCH, wherein the upcoming periodic allocations in the opposite direction are used to convey the in band ACK/NACK feedback instead of using a separate control channel. The coding of the ACK/NACK may be made robust within the repeating periodic allocations. While the in-band HARQ feedback transmission may increase the round trip time for retransmissions (based on the periodicity of the LPCH resources), the applications for which use the LPCH mechanism may not require low latency. Further, for asymmetric traffic, in a given LPCH transmission, several packets (received in the opposite direction) may be ACK/NACKed in one delayed ACK/NACK message. This reduces the control signaling overhead further.

Further, in some implementations, only one HARQ process may be employed. This is suitable for applications that send small packets of infrequent data that do not benefit from multiple HARQ processes, because there is too little data that need not be delivered in parallel. For example, the HARQ feedback from the UE for the transport block that was transmitted in the downlink LPCH is sent in the subsequent uplink LPCH allocation. The same alternating sequence can be used in the uplink direction as well. FIG. 10 illustrates this in UEs 1 and 2. The HARQ ACK/NACK for DL data for UE1 sent in subframe n is sent by the UE in subframe n+P, where P is the periodicity of the allocations for UE1. The ACK/NACK corresponding to a particular downlink data transmission is shown by arrows 1002, 1004, and 1006, while the ACK/NACK corresponding to a particular uplink data transmission is shown by arrows 1008, 1010, and 1012. Downlink retransmissions, when indicated as needed by a NACK, are sent in the next downlink allocation for the UE (shown by dotted line 1014), while the uplink retransmissions when indicated as needed by an uplink NACK, are sent in the next uplink allocation for the UE (shown by dotted line 1016).

In the example above, the maximum throughput achievable by a UE will also be restricted because of the single HARQ process because the transmitter will not be able to pipeline new data transmissions while waiting for an ACK/NACK for a pending data transmission. Throughput is however not a metric that is materially important for low priority applications that will use LPCH. Further, the allocations in the uplink and downlink need not be sized similarly in some cases. Indeed, the size of the allocations may be changed be suitable to the applications and their directionality by signaling methods described above.

In some implementations, more than one HARQ process may be used within the LPCH, where each allocation is for a new transmission or a retransmission of one particular HARQ process. In some embodiments, the sequence number and the HARQ process number may be explicitly signaled via in band signaling. In some embodiments, the process numbers are implicitly defined as a function of the grant number.

Figure 11:
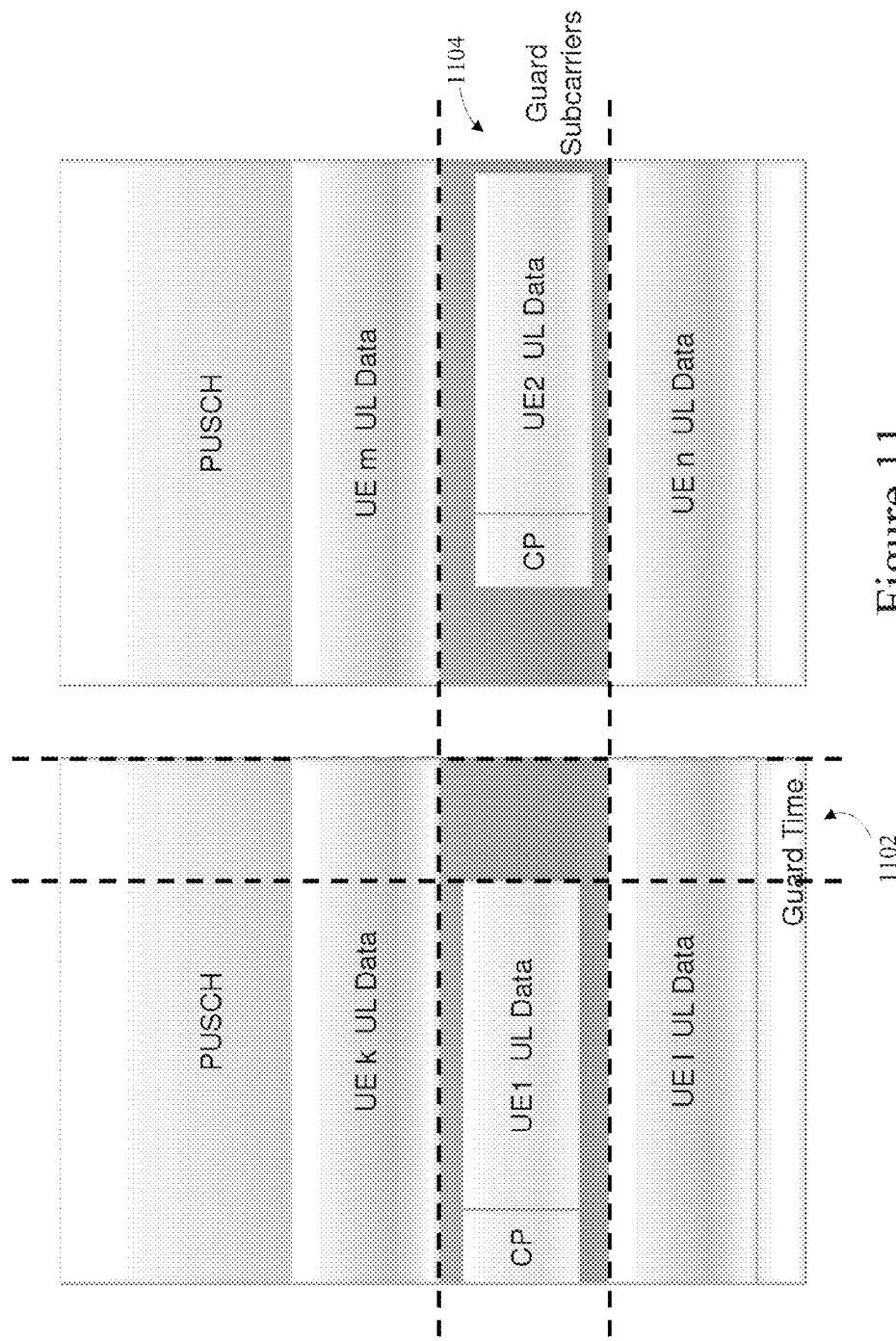
FIG. 11 illustrates a self-contained data channel with guards.

FIG. 11 illustrates a self-contained data channel with guards. In order to support the infrequent allocations, LPCH allows the UEs to send data with looser time synchronization requirements. In many of the use cases of LPCH (e.g., where the UEs are smart meters), the time alignment provided at setup time is adequate. In other cases, the LPCH provides guard periods (or longer Cyclic Prefix (CP)) and suitable guard bands to avoid the overhead of giving each of the very low priority UEs the precise time synchronization as the high priority UEs in the system. For example, static devices like smart meters would be able to use the resource without the additional guard periods while more mobile UEs could use the resource with additional guard periods to avoid interference in the uplink.

One overhead involved in a synchronized system, such as LTE, is the signaling necessary to maintain uplink timing alignment. With LPCH, this overhead could be minimized or totally eliminated. Currently, the UE is expected to synchronize with the downlink. It then sends sounding reference signals (SRS) (or similar) transmissions that are used for generating timing corrections at the eNB. In some implementations of the LPCH, the UL SRS transmissions could be eliminated or significantly reduced. Additionally, the Time Alignment (TA) messages sent using PDCCH may also be eliminated or significantly reduced. In some implementations, the UE may still synchronize to the downlink timing. Further, time alignment for the UL may be determined by using in-band reference signals that are present in LPCH transmissions. Further, any uplink timing corrections that are required may be sent by the eNB in time alignment commands sent within the LPCH. The LPCH may also be configured with time guards 1102 and/or frequency guards 1104 to allow for looser time alignment than dynamic data. The appropriately dimensioned guard sub channels 1104 and guard times 1102 may be inserted in the LPCH resources depending upon the expected error in time and frequency that needs to be tolerated in LPCH.

Figure 14:
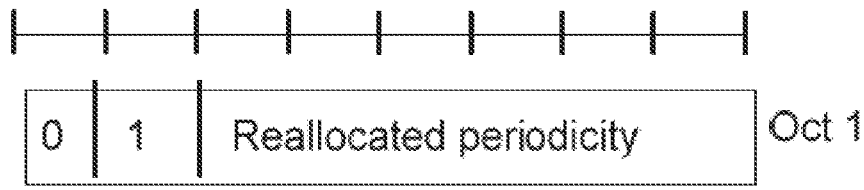
Figure 15:
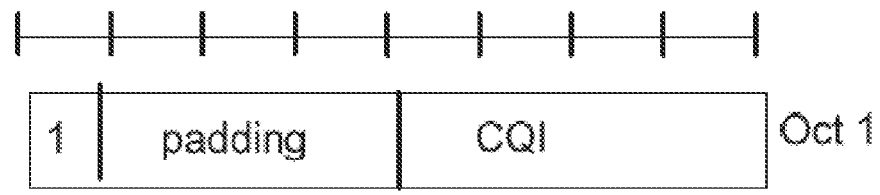

FIG. 12 illustrates a channel identification index value for commands associated with a Low-Priority Channel (LPCH). For example, the index value 11010 may be reserved for LPCH specific downlink commands and the index value 11000 may be reserved for LPCH specific uplink commands. FIGS. 13-15 illustrate examples of control elements relevant to the LPCH. A MAC subheader with the unique logical channel identification (LCID) indicates that the payload is a MAC control element. The MAC control element then could be coded in one of the following ways as shown in FIG. 13 or FIG. 14 to indcate reallocated LPCH resources. The reallocated RBs use the 11 bits in the same format as PDCCH DCIs filed indicating RB allocation. FIG. 13 illustrates a LPCH reallocation CE to indicate new RBs (i.e., to modify the frequency location of the LPCH resources). FIG. 14 illustrates a LPCH reallocation CE to indicate new periodicity (i.e., to modify the time at which the LPCH resource occur). Similarly an new uplink MAC control element could be defined to send inband uplink control information like channel quality information (as shown in FIG. 15).

FIG. 16 illustrates a configuration information element for the LPCH. The IE LPCH-Config is used to specify the LPCH configuration. In one implementation, the network controller may send the LPCH-Config element to the UE to instruct the UE to use the features of the LPCH for subsequent data and control signal transfers. For example, the LPCH-Config element instructs the UE to use the in-band control signaling features of the LPCH. FIG. 17 illustrates configuration field descriptions for the LPCH.

Each of the processes described herein may be encoded in a computer-readable storage medium (e.g., a computer memory), programmed within a device (e.g., one or more circuits or processors), or may be processed by a controller or a computer. If the processes are performed by software, the software may reside in a local or distributed memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable storage medium," "machine-readable medium," "propagated-signal" medium, and/or "signal-bearing medium" may comprise a medium (e.g., a non-transitory medium) that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a computer and/or machine memory.

While various embodiments, features, and benefits of the present system have been described, it will be apparent to those of ordinary skill in the art that many more embodiments, features, and benefits are possible within the scope of the disclosure. For example, other alternate systems may include any combinations of structure and functions described above or shown in the figures. Additionally, although the proposed systems and methods may form a new low priority Channel (LPCH), the features described herein may also be applicable to existing channels of LTE. Furthermore, although several described implementations relate to 3GPP LTE, the features described herein are not restricted to this system or radio access technology. Rather, these features could equally apply to other systems or radio access technologies, such as 3GPP GERAN, 3GPP UTRAN, 3GPP2 CDMA2000, IEEE 802.11x, Wimax, and others. Although some signals have been described herein as being in the downlink or uplink exclusively, some other implementations may use the signals described above in either direction.

What is claimed is:

1. A data transfer method, comprising:
   establishing at least one data transfer resource in a self-contained data channel between user equipment and a network controller;
   transferring user data between the user equipment and the network controller in at least one of the plurality of data transfer resources of the self-contained data channel; and
   transferring control between the user equipment and the network controller in at least one data transfer resource of the self-contained data channel without using a separate control channel between set-up and tear-down of the self-contained data channel
   wherein the data transfer method is implemented in a data transfer system comprising a computer processor coupled to a computer memory device that stores a channel management application executable by the computer processor to perform the data transfer method.

2. The method of claim 1, where the network controller comprises an Evolved Node B (eNB) device in a Long-Term Evolution (LTE) network.

3. The method of claim 1, where the network controller comprises a node in a 3GPP GERAN, 3GPP UTRAN, 3GPP2 CDMA2000, IEEE 802.11x, or Wimax network.

4. The method of claim 1, where the user equipment is a first user equipment device, and where the network controller is a second user equipment device.

5. The method of claim 1, where the self-contained data channel is a self-contained uplink data channel from the user equipment to the network controller, the method further comprising requesting a change to a parameter of at least one of the data transfer resources by transmitting a data transfer modification request from the user equipment to the network controller as an in-band control signal in at least one of the data transfer resources of the self-contained uplink data channel.

6. The method of claim 5, where the parameter is a size of at least one of the data transfer resources or a periodicity of at least one of the data transfer resources.

7. The method of claim 5, further comprising receiving an identification of a new data transfer resource or a modified data transfer resource at the user equipment from the network controller as an in-band control signal in a self-contained downlink data channel.

8. The method of claim 1, where the self-contained data channel is a self-contained downlink data channel from the network controller to the user equipment, the method further comprising receiving an identification of a new data transfer resource or a modified data transfer resource at the user equipment from the network controller as an in-band control signal in a self-contained downlink radio resource.

9. The method of claim 1, where the step of establishing the at least one data transfer resource in the self-contained data channel comprises:
analyzing quality of service data associated with an application that generates the user data for transfer between the user equipment and the network controller.

10. The method of claim 1, where the step of establishing the at least one data transfer resource in the self-contained data channel comprises:
selecting the self-contained data channel from multiple available channel formats for the user equipment based on quality of service data.

11. The method of claim 10, where the multiple available channel formats comprises a channel format with a scheme for embedding control information in a physical layer and control information conveyed in a medium access layer.

12. The method of claim 1, where the step of transferring control information comprises transmitting hybrid automatic repeat request acknowledgements or negative-acknowledgements as in-band control signaling between the user equipment and the network controller in at least one of the data transfer resources of the self-contained data channel rather than transmitting the hybrid automatic repeat request acknowledgements or negative-acknowledgements in resource of a physical uplink control channel (PUCCH).

13. The method of claim 12, where an uplink data transfer resource of the self-contained data channel contains the hybrid automatic repeat request acknowledgements or negative-acknowledgements for a previous downlink data transfer resource.

14. The method of claim 1, where the step of transferring control information comprises transmitting one or more of a scheduling request, a channel quality indication report, or a buffer status report as in-band control signaling from the user equipment to the network controller in at least one of the plurality of data transfer resources of the self-contained data channel.

15. The method of claim 1, where the at least one data transfer resource comprises a plurality of data transfer resources pre-assigned to the user equipment before transferring the user data and the control information.

16. The method of claim 1, where the at least one data transfer resource comprises a plurality of data transfer resources that are repeating resources.

17. The method of claim 1, where the at least one data transfer resource comprises a plurality of data transfer resources loosely synchronized in time.

18. The method of claim 17, where at least one of the plurality of data transfer resources is provided with a guard time.

19. The method of claim 1, where the at least one data transfer resources comprises a plurality of data transfer resources loosely synchronized in frequency.

20. The method of claim 19, where at least one of the plurality of data transfer resources is provided with a guard band.

21. A data transfer system, comprising:
a computer processor;
a computer memory device coupled with the computer processor; and
a channel management application stored in the computer memory and executable by the computer processor to cause the computer processor to:
establish a data transfer resource in a self-contained data channel between user equipment and a network controller;
transfer user data between the user equipment and the network controller in the data transfer resource of the self-contained data channel; and
transfer control data between the user equipment and the network controller in the data transfer resource of the self-contained data channel without using a separate control channel between set-up and tear-down of the self-contained data channel.

22. The system of claim 21, where the network controller comprises an Evolved Node B (eNB) device in a Long-Term Evolution (LTE) network.

23. The system of claim 21, where the network controller comprises a node in a 3GPP GERAN, 3GPP UTRAN, 3GPP2 CDMA2000, IEEE 802.11x, or Wimax network.

24. The system of claim 21, where the self-contained data channel is a self-contained uplink data channel, where the channel management application is executable by the computer processor to cause the computer processor to:
transmit a data transfer modification request as in-band control signaling in the data transfer resource of the self-contained uplink data channel; and
receive an identification of a new data transfer resource or a modified data transfer resource from the network controller to the user equipment using in-band control signaling in a self-contained downlink data channel.

25. The system of claim 21, where the channel management application is executable by the computer processor to cause the computer processor to:
analyze quality of service data associated with the user equipment; and
select the self-contained data channel from multiple available channel formats for the user equipment based on the quality of service data.

26. The system of claim 21, where the channel management application is executable by the computer processor to cause the computer processor to transmit hybrid automatic repeat request acknowledgements or negative-acknowledgements as in-band control signaling between the user equipment and the network controller in the data transfer resource of the self-contained data channel.

27. The system of claim 21, where the channel management application is executable by the computer processor to cause the computer processor to transmit one or more of a scheduling request, a channel quality indication report, or a buffer status report as in-band control signaling from the user equipment to the network controller in the data transfer resource of the self-contained data channel.

28. A data transfer method, comprising:
receiving a data transfer request at a network controller from user equipment;
allocating a data transfer resource in a self-contained data channel for the user equipment in response to the data transfer request, where the step of allocating the data transfer resource comprises selecting a fixed resource periodically and fixed resource size for a periodic use of the data transfer resource by the user equiptment;
transmitting an identification of the data transfer resource from the network controller to the user equipment; and
instructing the user equipment to use in-band control signaling in the self-contained data channel.

29. The method of claim 28, where the step of instructing the user equipment comprises instructing the user equipment to use in-band control signaling in the self-contained data channel for all control signals between set-up and tear-down of the self-contained data channel, the method further comprising transmitting in-band control signals from the network controller to the user equipment in a self-contained downlink data channel without using a separate control channel between set-up and tear-down of the self-contained downlink data channel.

30. The method of claim 28, where the self-contained data channel is a self-contained uplink data channel, the method further comprising:
- receiving a data transfer modification request as in-band control signaling in the data transfer resource of the self-contained uplink data channel;
- allocating a new data transfer resource or modifying a parameter of the allocated data transfer resource in response to the data transfer modification request; and
- transmitting an identification of the new data transfer resource or the modified data transfer resource from the network controller to the user equipment using in-band control signaling in a self-contained downlink data channel.

31. The method of claim 1, where the self-contained data channel is a bidirectional channel optimized to carry small amounts of low-priority data, the low-priority data comprising presence information and/or machine type communication (MTC) traffic.

* * * * *

UNITED STATES PATENT AND TRADEMARK OFFICE
CERTIFICATE OF CORRECTION

Page 1 of 1

PATENT NO. : 9,215,656 B2
APPLICATION NO. : 13/918332
DATED : December 15, 2015
INVENTOR(S) : Pecen et al.

It is certified that error appears in the above-identified patent and that said Letters Patent is hereby corrected as shown below:

In the claims

Claim 1, Column 16, Line 33 replace "channel" with --channel,--

Claim 12, Column 17, Line 29 replace "resource of" with --resources of--

Claim 19, Column 17, Line 56 replace "transfer resources" with --transfer resource--

Signed and Sealed this
Fifteenth Day of March, 2016

Michelle K. Lee
*Director of the United States Patent and Trademark Office*